United States Patent [19]
Normandin

[11] Patent Number: 4,776,658
[45] Date of Patent: Oct. 11, 1988

[54] FIBER OPTIC MODULATOR

[75] Inventor: Richard J. F. Normandin, Ottawa, Canada

[73] Assignee: Canadian Patents and Development Limited, Ottawa, Canada

[21] Appl. No.: 79,767

[22] Filed: Jul. 30, 1987

[51] Int. Cl.[4] .......................... G02B 6/26; G02F 1/35
[52] U.S. Cl. .......................... 350/96.15; 350/96.13; 350/354
[58] Field of Search ............... 350/96.15, 96.13, 353, 350/354; 307/425–430

[56] References Cited

U.S. PATENT DOCUMENTS

| | | | |
|---|---|---|---|
| 3,790,252 | 2/1974 | Pao | 350/354 |
| 4,190,811 | 2/1980 | Alcock et al. | 350/354 X |
| 4,558,923 | 12/1985 | Hoffman et al. | 350/354 |
| 4,597,638 | 7/1986 | Chemla et al. | 350/354 |
| 4,693,547 | 9/1987 | Soref et al. | 350/96.13 |

OTHER PUBLICATIONS

Third Canadian Semiconductor Technology Conference, Aug. 20–22, 1986, Ottawa, Ontario, Canada.
Optics Letters, vol. 11, pp. 751–753, Nov. 1986.

Primary Examiner—John D. Lee
Attorney, Agent, or Firm—Yoshiharu Toyooka

[57] ABSTRACT

New all-optical modulators that use nonlinear refraction and absorption to modify fiber-to-fiber coupling are disclosed. No resonators, feedback or stringent wavelength controls are needed. Implementations of the AND, NOR, NOT and XOR gates with better than 20 dB contrast ratio are described and demonstrated.

14 Claims, 7 Drawing Sheets

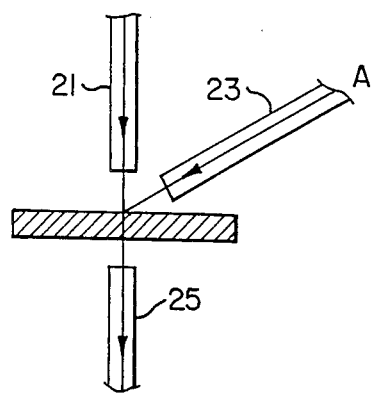
FIG. 5a
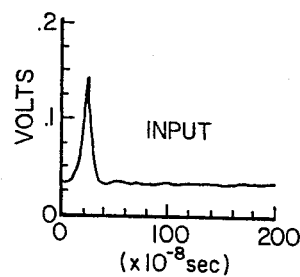
FIG. 5b
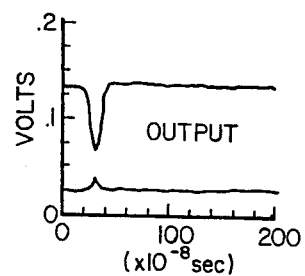
FIG. 5c
| NOT | GATE |
|---|---|
| A | OUT |
| 0 | 1 |
| 1 | 0 |
FIG. 5d
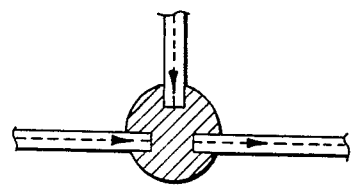
FIG. 9

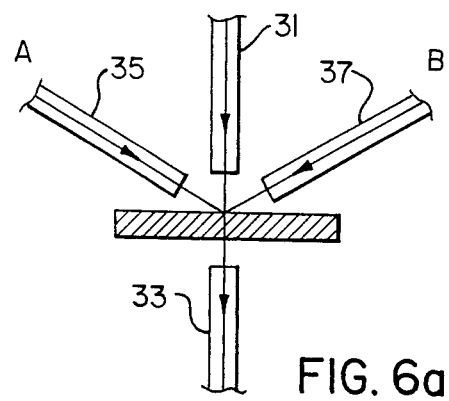
FIG. 6a
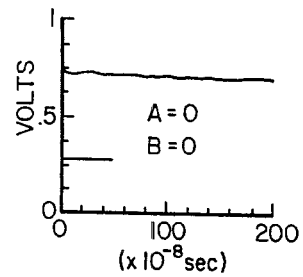
FIG. 6b
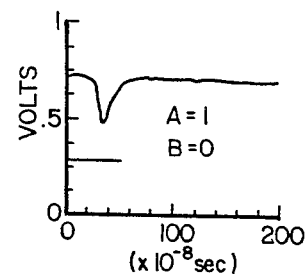
FIG. 6c
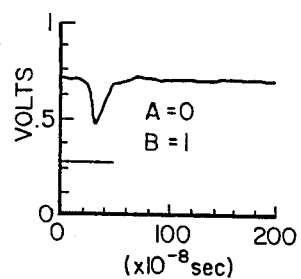
FIG. 6d
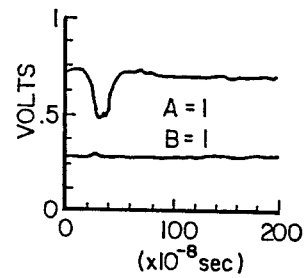
FIG. 6e
```
NOR
A  B   OUT
0  0    1
1  0    0
0  1    0
1  1    0
```
FIG. 6f

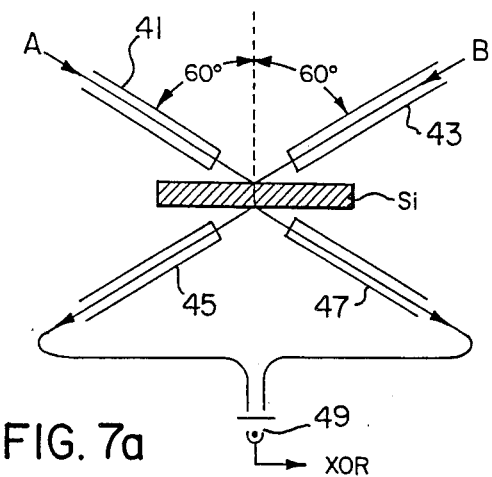
FIG. 7a
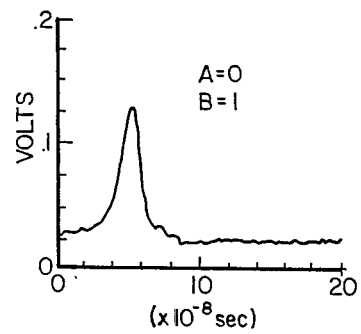
FIG. 7b
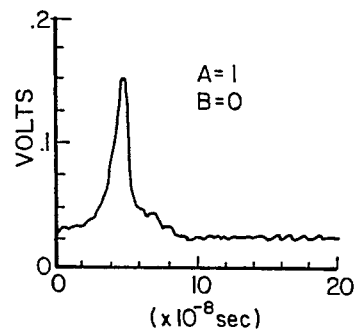
FIG. 7c
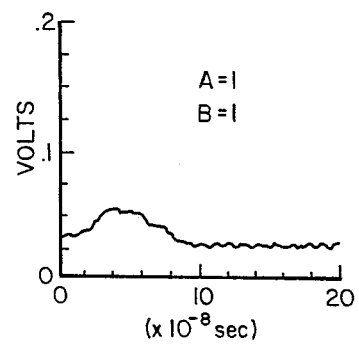
FIG. 7d
XOR
| A | B | OUT |
|---|---|-----|
| 0 | 0 | 0 |
| 0 | 1 | 1 |
| 1 | 0 | 1 |
| 1 | 1 | 0 |
FIG. 7e

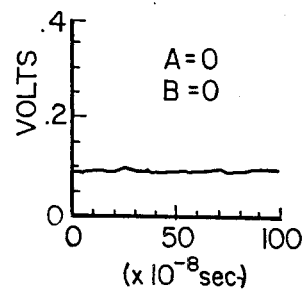
FIG.8c
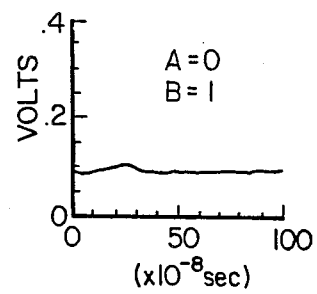
FIG.8d
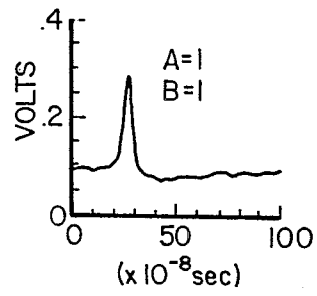
FIG.8e
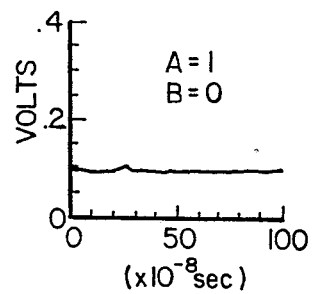
FIG.8f
```
    AND
A   B   OUT
0   0   0
0   1   0
1   0   0
1   1   1
```
FIG. 8g

FIBER OPTIC MODULATOR

FIELD OF THE PRESENT INVENTION

The present invention relates to all optical modulators and in particular is directed to optical gates and modulators utilizing the intrinsic properties of waveguide-to-waveguide coupling to achieve a high signal to noise ratio and high speed operation with moderate driving power in an all-optical fiber optics context.

BACKGROUND OF THE INVENTION

Reduced losses in fibers, increased bandwidth, and mode locking of solid state laser sources in recent years have set the stage for optical communication links whose bit rates are much improved over contemporary usage. To date, however, all the signal handling has been done in the conventional electronic manner. Nevertheless, there has been a renewed interest in all-optical amplifiers, switches and signal processing to circumvent some of the conventional electronics problems for high speed operation. Several approaches have been explored: optical bistable devices, nonlinear Fabry-Perot (FP) resonators, nonlinear waveguide interferometers, nonlinear birefringent fibers, saturable gain media or Brillouin amplification, to note a few. Obviously, for optical signals in a fiber an all-optical processing device has a natural advantage provided its performance and compexity is on par with or better than, its electronic counterpart. On the other hand the theoretical bandwidth and speed advantages possible with all-optical devices are orders of magnitudes higher than electronic circuits. U.S. Pat. No. 4,505,301 Apr. 29, 1986 (Bialkowski) also teaches optically actuated optical switch apparatus and method. The patent uses a switching medium whose refractive index is changed by a control beam, selectively directed into the switching medium. The control beam produces a thermal gradient in the switching medium which in turn generates a refractive index gradient to produce a deflection of the probe beam.

Contrary to the above mentioned techniques, the present invention requires no Fabry-Perot resonators, feedback or strict wavelength control for any of the input/output beams. Therefore the device operation is noncritical and stable. Unlike the above-referenced patent, a very small power is required at the control to modulate a signal beam. Since, it is the extreme sensitivity of the fiber to fiber coupling to the effective numerical aperture ratio (mode overlap) that is used to provide the basic modulation technique instead of a simple deflection, the result is a drastic lowering in required energy to activate the modulator.

OBJECTS OF THE PRESENT INVENTION

It is therefore an object of the present invention to provide an all optical fiber-optic modulator.

It is another object of the invention to provide all optical fiber-optic logic gates.

It is still another object of the present invention to provide an all optical fiber-optic modulator using non-linear refraction and absorption.

It is a further object of the present invention to provide all optical fiber-optic logic gates.

SUMMARY OF THE INVENTION

Briefly stated, the present invention is directed to a fiber optic modulator which comprises a first and a second single mode optical fibers and a coupling medium to optically mode-couple the said first and the second optical fibers along an optical path through the said coupling medium and defining a fiber-to-fiber coupling factor. The modulator further includes a single mode control optical fiber positioned relative to the said coupling medium to direct thereto a control light beam pulse having predetermined temporal or spatial profiles at a location along the optical path. The said coupling medium is made of an optically non-linear material which, upon exposure to the control light beam pulse, undergoes a local temporary change in optical characteristics whose spatial profile is dependent upon the said predetermined temporal spatial profiles of the control light beam pulses so that the said coupling factor is modified due to the apparent change in field overlap integral resulting in the change in effective numerical aperture of the said first optical fiber as seen by the said second optical fiber.

BRIEF DESCRIPTION OF THE DRAWINGS

The above and other features of this invention will be more fully understood from the following detailed description and the accompanying drawings, in which:

FIG. 5a is a schematic illustration of a modulator according to another embodiment as a NOT gate.

FIGS. 5b and 5c are graphs showing experimental results for input and output curves.

FIG. 5d is the truth table for the modulator of FIG. 5a.

FIGS. 6a is a schematic illustration of a modulator according to still another embodiment of the invention as a NOR gate.

FIGS. 6b, 6c, 6d and 6e are graphs showing output curves of the modulator shown in FIG. 6a at various logic states.

FIG. 6f is a truth table of the modulator shown in FIG. 6a.

FIG. 7a is a schematic illustration of a modulator according to other embodiment of the invention as an XOR gate.

FIGS. 7b, 7c and 7d are graphs showing output curves of the modulator shown in FIG. 7a at various logic states.

FIG. e is a truth table of the modulator of FIG. 7a.

Figure 8A:
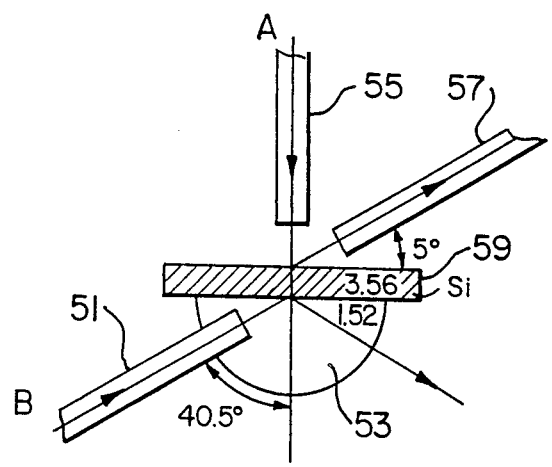

FIG. 8a is a schematic illustration of a modulator according to still other embodiment of the invention as an AND gate.

Figure 8B:
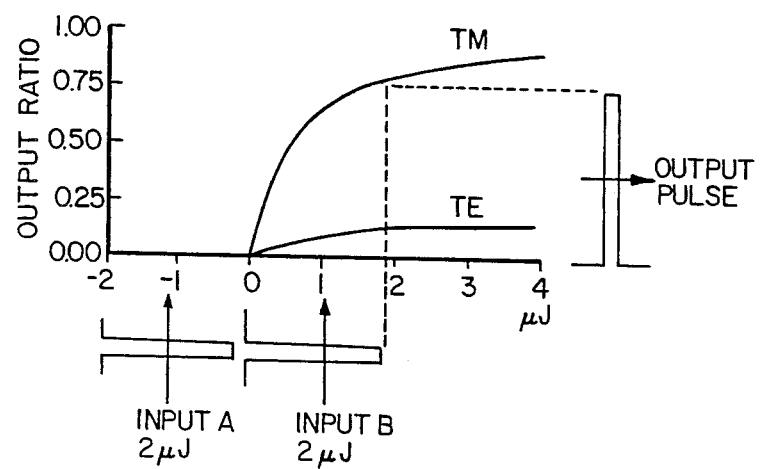

FIG. 8b is a graph showing the transfer curve for the operation of the modulator of FIG. 8a as an AND gate.

FIGS. 8c, 8d, 8e and 8f are graphs showing output curves of the modulator shown in FIG. 8a at various logic states.

FIG. 8g is a truth table of the modulator of 8a.

FIG. 9 is a schematic illustration of another embodiment of the invention.

DETAILED DESCRIPTION OF THE PREFERRED EMBODIMENTS

Figure 1:
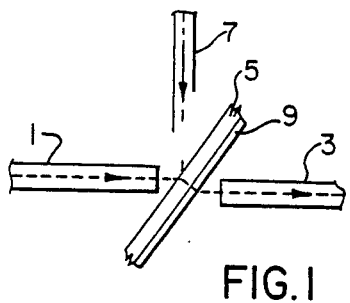
FIG. 1 is a schematic illustration of an all optical modulator according to one embodiment of the present invention.

FIG. 1 shows schematically a basic all optical modulator according to one embodiment of the present invention. A first single-mode optical fiber 1 and a second single-mode optical fiber 3 are mode coupled via a thin slab 5 of an optically non-linear transparent material e.g. Si. Light from the first optical fiber 1 is transmitted through the thin Si slab 5 to the second optical fiber 3. The coupling loss is acceptable since end-to-end coupling of single-mode fibers is rather tolerant of end separation. On the other hand, the coupling ratio is very sensitive to mismatch in numerical aperture (NA), to angular misalignment or to any perturbation of the propagating mode field. It is this sensitivity that is exploited here to create the modulation in coupling factor by introducing a "control" or "gate" optical fiber. FIG. 1, therefore, includes such a control optical fiber at 7. In this embodiment, the thin slab 5 is made of a 63-$\mu$m-thick n-type phosphorous-doped ($10^{14}$cm$^{-3}$,) single-crystal silicon wafer.

Figure 2:
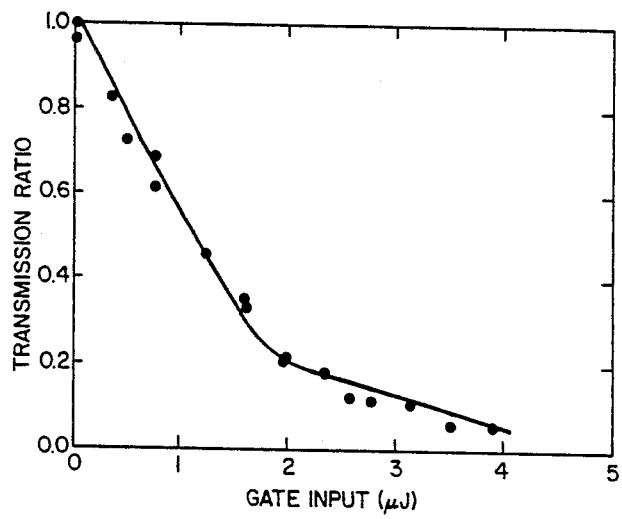
FIG. 2 is a graph showing experimental and calculated data for the embodiment shown in FIG. 1 in the case of silicon.

An antireflection coating 9 is applied on the back or both sides of the wafer to eliminate Fabry-Perot effects. The optical fibers are 8 $\mu$m-core step-index-type with a NA=0.12 spaced 20 to 25 $\mu$m from the surface of the Si slab. A single-longitudinal-mode (SLM) passively Q-switched Nd:YAG laser giving an output at $\lambda=1.06$ $\mu$m with a Gaussian (spatial) - Gaussian (temporal) behaviour of $\tau 25$ $\eta=$sec ($\tau$: the Gaussian pulse width given by I=I$_0$exp $(-t^2/\tau^2)$) was used for the experiment. Transmission data obtained are shown in FIG. 2.

The modulator shown in FIG. 1 is now analyzed theoretically for its transmission properties.

The 1.06-$\mu$m laser pulse was assumed to be of Gaussian behavior in space and time at the slab. The change in refractive index due to intraband transitions of the free carriers (negative) was described by the Drude model, and the effect of increased lattice temperature T on the refractive index (positive) was expressed as $(\delta n/\delta T)\Delta T$, where the constant $\delta n/\delta T$ was taken from the literature. At $\lambda=1.06$ $\mu$m there is little excess energy per photon and heating by free-carrier intraband absorption is almost instantaneous on the nanosecond time scale considered here. The photogenerated carrier density and the lattice temperature were assumed constant throughout the thickness of the thin slab. Their values at the peak of the laser pulse were calculated self-consistently using temperature-dependent absorption coefficients associated with intraband and indirect interband transitions. The resulting change in refractive index at the peak of the pulse is given by $$\Delta n = - \frac{e^2 \tau \alpha(T) \sqrt{\pi}}{4 n m_{eh} \omega^2 \epsilon_0 h\nu} I_0 + \frac{\alpha(T)\sigma_{eh}(T)\tau^2\pi}{8Ch\nu} \frac{\partial n}{\partial T} I_0^2,$$

with $\alpha(T)=(T/172.3)^{4.25}$ cm$^{-1}$ and $\sigma_{eh}(T)=1.7\times 10^{-20}$ T cm$^2$ at $\lambda=1.06$ $\mu$m, where e is the electron charge, e$_o$ the free-space permittivity, m$_{eh}$ the optical effective mass of an electron-hole plasma, n the index of refraction at the angular frequency of the incident light $\omega$, $\alpha$ the linear absorption coefficient, $\tau$ the Gaussian pulse width given by I=I$_o$exp($-t^2/\tau^2$), C the heat capacity, $\sigma_{eh}$ the free-carrier absorption coefficient, and T the temperature. Other contributions are insignificant in the operating conditions of this device for this case since at these high densities free-carrier absorption and increased linear absorption reduce the throughput to near zero anyway at the spatial position. The previous expression for the change in index in the center spot may be used to calculate the effective focal length of the negative lens thus created at low energies, i.e., $$f_{eq} \approx a_o^2/2d\Delta n,$$

where a$_o$ is the Gaussian spot size and d the wafer thickness. Thus the usual lens formula then relates the magnification, position, and effective NA of the input fiber as seen by the output fiber. Then, assuming no tilt or offset, the coupling efficiency between two single-mode fibers reduces to $4\sigma/q$ with $\sigma$ as the ratio of the square of the mode radii (s$_2$/s$_1$)$^2$ and q=(z/kS$_1^2$)+($\sigma$+1)$^2$, z being the longitudinal displacement. This result is obtained by computing the Gaussian mode overlap of the input field at the output fiber and provides the main sensitivity of this modulation geometry. Nonlinear absorption is also taken into account and, along with the index change, is spatially and phase integrated over the interaction region to yield the total throughput to the output fiber.

Referring now to FIG. 2, the solid line was obtained using the following literature values for silicon: m$_{eh}$=0.16 m$_e$, n=3.56, C=0.7 J/gk$^o$, d=10 $\mu$m, and $\partial n/\partial T=1.5\times 10^{-4}$ k$^{-1}$. The dots indicate values obtained in the experiment. The exceptional fit to the data was obtained without adjustable parameters and justifies well our neglect of higher-order nonlinear effects in this embodiment.

Figure 3:
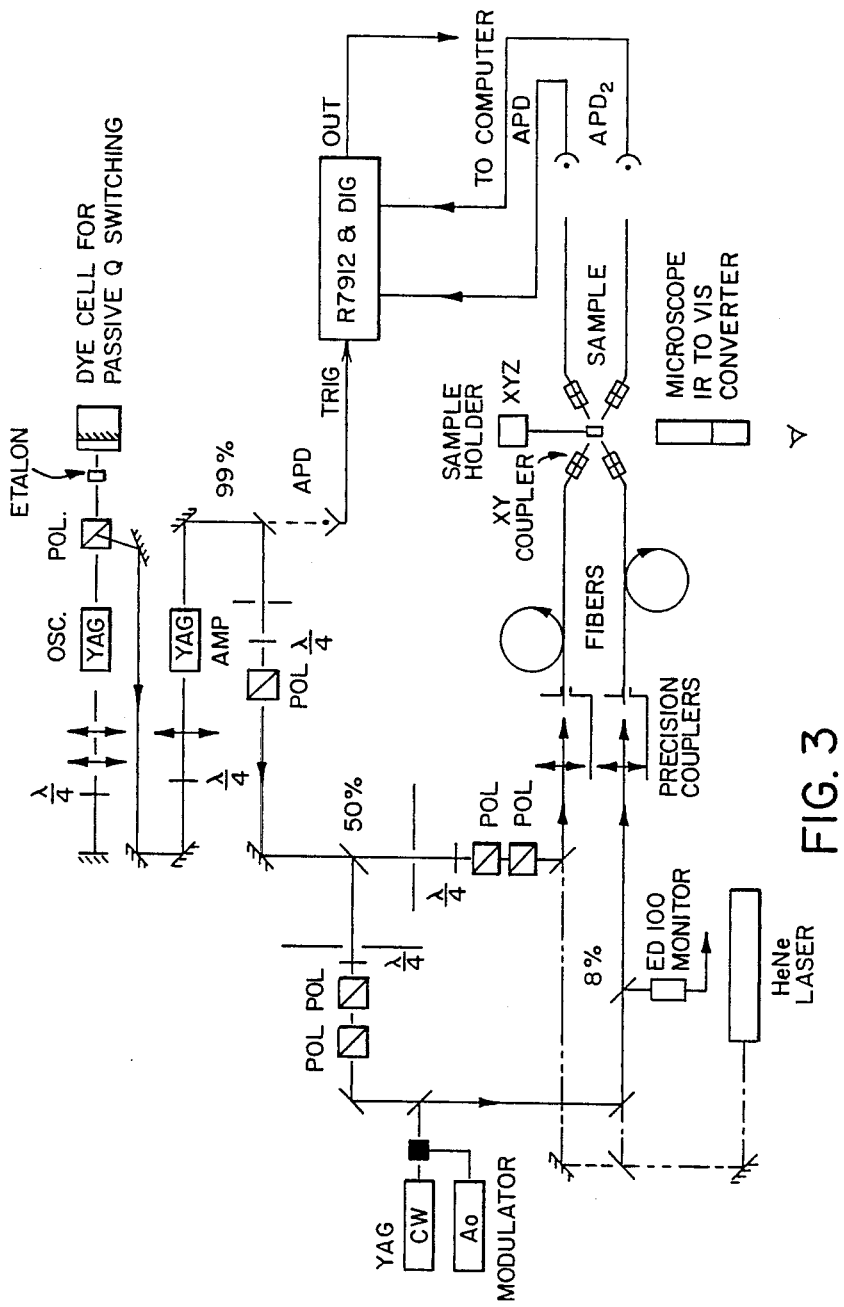
FIG. 3 is a schematic illustration of a whole set-up for the experiments for testing purposes.

The experimental whole setup is shown schematically in FIG. 3. Light from a passively Q-switched single longitudinal mode (SLM) Nd-YAG laser was highly attenuated to obtain a few $\mu$J pulses of 1.06 $\mu$m light with a Gaussian spatial and temporal behaviour. The pulses were approximately 20 to 25 ns. The beam was then split into two independently adjustable input pulses to the sample. Furthermore a CW Nd-YAG laser of a few mW average power was also available as a holding beam for some gates. Precision couplers were then used to input the 1.06 $\mu$m light in the 8 $\mu$m core step-index fibers of NA=0.12. These were then positioned approximately 20 to 25 $\mu$m from the silicon sample with an XYZ precision translation stage. Integrated pulse energies were measured with an ED-100 joulemeter calibrated against several others. Data was recorded and used only for good SLM operation of the laser (80% of the time).

Figures 4A, 4B:
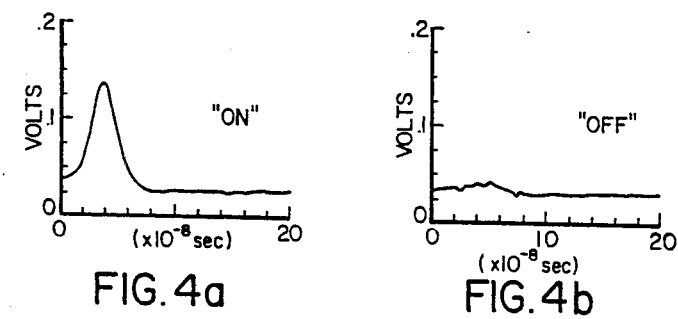
FIGS. 4a and 4b are graphs showing output curves for "on" and "off" states of the modulator according to the embodiment of FIG. 1.

A typical pulse in the ON and OFF states of the modulator is shown in FIGS. 4a and 4b, with 4-$\mu$J input applied to the gate fiber for an OFF state of about 20-dB contrast ratio. In this geometry the throughput was 0.4, consistent with Fresnel reflection losses at about 45° for an unpolarized beam. AR coatings on each face or a more transparent material will give better throughput and fanout for the gates. By using an IR-to-visible image converter, a defocussing magnification ratio of ~3 was also observed in the NA of the transmitted light through the Si wafer, consistent with our estimates.

FIG. 5a illustrates schematically another embodiment of the present invention. This implementation is a NOT gate (an inverter). Light from a CW Nd:YAG laser of a few tens of milliwatts is coupled to an optical fiber 21. The inverter input is applied to the control optical fiber 23 and the output is obtained at an optical fiber 25. The input at 23 irradiates the interaction region with 2 μJ of 1.06 μm light for 25 ns. FIGS. 5b and 5c show the input and the output curves and FIG. 5d is a truth table. The lower trace in FIG. 5c indicates the zero level of the R7912 digitizer used for data acquisition.

FIG. 6a shows still another embodiment of the present invention, a NOR gate. As in FIG. 5a, a Nd:YAG laser supplies a CW light at an optical fiber 31 and the logic output is obtained at an optical fiber 33. The logic inputs A and B, each being a light pulse of 2 μJ at 1.06 μm for 25 ns, are applied at optical fibers 35 and 37. FIGS. 6b, 6c, 6d and 6e show output curves together with zero level as in FIG. 5c. FIG. 6f displays the truth table of the NOR gate.

Recovery time for these geometries would be in the microsecond if carrier recombination was the only mechanism available to remove them. However, owing to the small ($\sim 10\mu m$ here), ambipolar diffusion of the photogenerated carriers out of the region is much shorter ($D_a \sim 19$ cm$^2$/s, therefore $\sigma_{diff} = \phi^2/D_a$ and thus $\sigma_{diff} \sim 15$ to 40 ns here). This is consistent with the recovery times shown in FIGS. 5c and 6a to 6e. Also note that several other "input" fibers may be added to the gate to act as a logic multiplexer, limited only by the number of fibers physically in the line of sight of the interaction region. Although the NOT and NOR gates are trivial extensions of the previously described modulator the other logic functions were implemented in a different geometry.

The realization of the exclusive OR (half binary adder or XOR) is shown in FIG. 7a. When the 2μJ pulse is present on either Input A or Input B at optical fibers 41 and 43 it is transmitted to its respective output fiber 45 or 47 and coupled out to the photodetector. However when a pulse is present on BOTH Input A and Input B induced "mutual" defocussing will change the NA sufficiently to drop the throughput to a low value in accordance to the XOR truth table shown in FIG. 7e. Also the increased nonlinear absorption is helping to increase the contrast ratio here. All the optical fibers are oriented with respect to each other and to a Si slab as shown in the figure. As evident from the figure, each of input A and input B functions as a control gate of the other.

If the output is to be used by another fiber device, a 3dB coupler 49 oan join the two output fibers into one. FIGS. 7b, 7c and 7d show suoh output ourves. The broad shoulder on the pulses are the result of a deteriorated Q-switch dye and not the gate operation.

It is also possible to use more than four (two pairs of) optical fibers in other embodiments similar to one shown in FIG. 7a. More than two pairs of optical fibers are symmetrically arrayed with respsct to the coupling medium in similar fashion as in FIG. 7a. Light beam pulses from optical fibers modify the optical characteristics of the coupling medium to alter the coupling factor between the optical fibers of each pair.

An implementation of an AND gate and its operation pririple are shown in FIGS. 8a and 8b in which Input A fiber 51, Input B fiber 55 and output fiber 57 are oriented at angles of 40°, 50°, 180° and 265° respectively from an axis normal to the surface of the coupling medium 59 of a silicon slab. Light from the B fiber 51 is incident of the silicon slab of 63μm thick through a drop of index-matching fluid (n=1.52) such that the angle of incidence is at or exceeds slightly the critical angle at the top interface; therefore the incident light is reflected and none is transmitted. When light pulses are present simultaneously on both the Input A fibers 55 and Input B fibers 51 the index is lowered such that the critical angle no longer permits total internal reflection as it moves towards Brewster's angle. Other geometrical parameters are shown in the figure. In materials with high indices of refraction the critical angle and Brewster's angle are quite close to each other, as is evident in the TM transmission curve in the top part of FIG. 8b rapidly reaching near 100% transmission. This curve also depicts the operation of the gate when the Input B fiber 51 is about 0.5° below the critical angle with 2μJ needed to compensate. Another 2μJ pulse on the Input A fiber 55 lowers the index further and lets about 75% of the Input B light 51 through to the output fiber 57. Experimentally the Input 3 fiber 51 was rotated until transmission could no longer be observed. The Input A and Output fibers 55 and 57 were then positioned and the gate operation monitored and optimized while epoxy glue cured. As with the other gates, results with 2μJ as input gave an excellent contrast ratio (as shown in the right hand portion of FIG. 8b). Output curves are shown in FIGS. 8c, 8d, 8e and 8f and the truth table in FIG. 8g. The contrast ratio is only limited by stray light on the photodiode as shown in FIG. 8c.

In previous embodiments, the coupling medium is mainly a slab of silicon. However other optically non-linear materials can be used. The material can be solid, liquid, gas or plasma. When fluid coupling medium is used, optical fibers can simply be immersed in it as shown in figure 9, to form mode-coupling between the fibers.

I claim:

1. A fiber optic modulator comprising:
   a first and a second single mode optical fibers;
   a coupling medium optically mode-coupling the said first and the said second optical fibers along an optical path through the said coupling medium and defining a fiber-to-fiber coupling factor; and
   a single mode control optical fiber positioned relative to the said coupling medium to direct thereto a control light beam pulse having pre-determined temporal or spatial profiles at a location along the optical path;
   the said coupling medium being made of an optically non-linear material which upon exposure to the control light beam pulse, undergoes a local temporary change in optical characteristics whose spatial profile dependent upon said predetermined temporal and spatial profiles of the control light beam pulse so that the said coupling factor is modified due to the apparent change in field overlap integral resulting in the change in effective numerical aperture of the said first optical fiber as seen by the said second optical fiber.

2. A fiber optic modulator according to claim 1, further comprising:
   a plurality of single mode control optical fibers, each positioned relative to the said coupling medium to direct thereto a control light beam pulse having predetermined temporal or spatial profile at the said location along the optical path;
   the said coupling medium being made of an optically non-linear material which, upon exposure to the said control light beam pulses, undergoes a local temporary change in optical characteristics whose spatial profile is dependent upon the said predetermined temporal and spatial profiles of the said control light beam pulses so that the said coupling factor is modified due to the apparent change in field overlap integral resulting in the numerical aperture of the said first optical fiber as seen by the said second optical firber.

3. The fiber optic modulator according to claim 2, wherein:
the said coupling medium is a slab of silicon.

4. The fiber optic modulator according to claim 2, wherein:
the said coupling medium is a liquid, gas or plasma; and
the ends of said optical fibers are immersed therein to form mode-coupling therebetween.

5. The fiber optic modulator according to claim 1, further comprising:
an index-matching substance optically coupling the first optical fiber and the coupling medium, wherein
the first, the control and the second optical fibers are positioned at angles with respect to the said coupling medium to include total internal reflection which is controllable by the control light beam pulse.

6. The fiber optic modulator according to claim 5, wherein:
the said coupling medium is a slab of silicon; and
the first, the control and the second optical fibers are positioned at angles of 40.5°, 180° and 265° respectively from an axis normal to the said coupling medium.

7. The fiber optic modulator according to claim 5, wherein:
the said coupling medium is a liquid, gas or plasma; and
the ends of said optical fibers are immersed therein to form mode-coupling therebetween.

8. The fiber optic modulator according to claim 1, wherein
the said coupling medium is a slab of silicon.

9. The fiber optic modulator according to claim 1, wherein:
the said coupling medium is a liquid, gas or plasma; and
the ends of said optical fibers are immersed therein to form mode-coupling therebetween.

10. A fiber optic modulator comprising:
a plurality of pairs of single mode optical fibers;
couplling medium optically mode-coupling the said optical fibers of each of said pairs along an optical path through the said coupling medium and defining a fiber-to-fiber coupling factor for said each pair;
the said plurality of pairs of optical fibers being symmetrically positioned with each other with respect to the said coupling medium to each direct thereto a light beam pulse having a predetermined temporal or spatial profile at a location along the said plurality of optical paths;
the said coupling medium being made of an optically non-linear material which upon exposure to the said light beam pulse from said pairs of optical fibers, undergoes a local temporary change in optical characteristics whose spatial profile is dependent upon the said predetermined temporal and spatial profiles of the said light beam pulse so that each of the said coupling factors in modified due to the apparent integral resulting in the change in effective numerical aperture of one of the optical fibers of each pair as seen by the other thereof.

11. The fiber optic modulator according to claim 10, further comprising:
connecting means for mutually optically connecting a single mode optical fiber of each pair.

12. The fiber optio modulator aooordInS to oIaIm 5, whereIn the number of the said pairs of optical fibers is two.

13. The fiber optic modulator according to claim 11, wherein: the said coupling medium is a slab of silicon.

14. The fiber optic modulator according to claim 11, wherein:
the said coupling medium is a liquid, gas or plasma; and
the ends of said optical fibers are immersed therein to for mode-coupling therebetween.

* * * * *

UNITED STATES PATENT AND TRADEMARK OFFICE
CERTIFICATE OF CORRECTION

PATENT NO. : 4,776,658
DATED : 11 October 1988
INVENTOR(S) : Richard J.F. Normandin It is certified that error appears in the above-identified patent and that said Letters Patent is hereby corrected as shown below:

Claim 1, column 6, line 48, insert --is-- between "profile" and "dependent"

Claim 1, column 6, line 48, insert --the-- between "upon" and "said"

Claim 10, column 8, line 7, correct spelling of "coupling"

Claim 10, column 8, line 25, replace "in" by --is--

Claim 12, column 8, lines 33 and 34, correct the passage "optio ... whereIn" to read --optic modulator according to claim 11, wherein--

Column 8, line 7, before the words "coupling medium" insert a--.

Signed and Sealed this

Third Day of July, 1990

*Attest:*

HARRY F. MANBECK, JR.

*Attesting Officer*  *Commissioner of Patents and Trademarks*